United States Patent
Ashinuma

(10) Patent No.: US 6,519,212 B2
(45) Date of Patent: Feb. 11, 2003

(54) METHOD FOR SETTING OPTIMAL REPRODUCTION POWER LEVEL IN DOMAIN WALL DISPLACEMENT MAGNETO-OPTICAL RECORDING DEVICE

(75) Inventor: Takaaki Ashinuma, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 52 days.

(21) Appl. No.: 09/760,648

(22) Filed: Jan. 17, 2001

(65) Prior Publication Data

US 2001/0028607 A1 Oct. 11, 2001

(30) Foreign Application Priority Data

Jan. 18, 2000 (JP) ........................................ 2000-009095

(51) Int. Cl.⁷ .............................................. G11B 11/00
(52) U.S. Cl. ..................................... 369/13.26; 369/116
(58) Field of Search ........................... 369/13.26, 13.24, 369/13.05, 13.06, 13.07, 13.08, 116, 13.27, 13.02

(56) References Cited

U.S. PATENT DOCUMENTS

| 5,517,471 A | 5/1996 | Ashimuna et al. ............. 369/13 |
| 5,796,704 A * | 8/1998 | Nanba ......................... 369/116 |
| 6,027,825 A | 2/2000 | Shiratori et al. ............. 428/694 |
| 6,084,830 A | 7/2000 | Ashimuma et al. ............ 369/13 |
| 6,246,641 B1 * | 6/2001 | Miyaoka ...................... 369/123 |

FOREIGN PATENT DOCUMENTS

JP         6-290496        10/1994

* cited by examiner

*Primary Examiner*—Tan Dinh
(74) *Attorney, Agent, or Firm*—Fitzpatrick, Cella, Harper & Scinto

(57) ABSTRACT

A reproduction power test method for setting an optimal power of a reproduction light beam for reproducing an information from a domain wall displacement type magneto-optical medium comprises the steps of detecting a domain wall displacement start reproduction power $Pr_{dwd}$ at which the domain wall starts to be displaced, and a maximum reproduction power $Pr_{max}$ allowing the domain wall displacement, and determining an optimal reproduction power Pr using a previously obtained relational expression whereby $Pr_{dwd}$, $Pr_{max}$ and the jitter characteristics of a reproduced signal are optimized.

12 Claims, 6 Drawing Sheets

METHOD FOR SETTING OPTIMAL REPRODUCTION POWER LEVEL IN DOMAIN WALL DISPLACEMENT MAGNETO-OPTICAL RECORDING DEVICE

BACKGROUND OF THE INVENTION

1. Field of the Invention

The present invention relates to a reproduction power test method for setting an optimal reproduction power when reproducing record information recorded on a magneto-optical medium by displacing a domain wall in the recording magnetic domain, and an optical information reproduction apparatus utilizing the method.

2. Related Background Art

Formerly, since the line recording density of an optical disk largely depends on the laser wavelength of a reproduction optical system and the numerical aperture of an objective lens and both a settled laser wavelength λ of the reproduction optical system and a settled numerical aperture NA of the objective lens determines the radius of a beam waist, the detectable spatial frequency at the time of reproduction of a signal is limited to the order of 2NA/λ. Thus, to implement a high density in a conventional optical disk, it is necessary to shorten the laser wavelength of a reproduction optical system and to increase the numerical aperture NA of an objective lens, but there is a limit to an improvement in laser wavelength and numerical aperture NA also. Accordingly, there has been developed a technique for improving the recording density by contriving the configuration of a recording medium and a reading method.

Also, the present applicant has proposed an information reproduction method capable of reproducing the signal recorded at a bit length of not greater than the diffraction limit of light in Japanese Patent Application Laid-Open No. 6-290496. The information reproduction method of the same publication will be briefly described referring to FIGS. 6A to 6C. Incidentally, here, the case of a 3-layered recording medium comprising a first magnetic layer (reproduction layer), a second magnetic layer (switching layer) and a third magnetic layer (recording layer) will be described as an example. The reproduction principle in the case of reproducing an information item on the basis of a temperature gradient formed by a reproducing light spot itself will be described. First, FIG. 6A is a sectional view of a recording medium. The magnetic layer of this medium takes a 3-layered structure comprising a first magnetic layer 601, a second magnetic layer 602 and a third magnetic layer 603 stacked in sequence. Arrowhead 604 in the respective layers represents the direction of atomic spins and a domain wall 605 is formed at the border between domains mutually opposite in direction of spins. Numeral 650 denotes a reproducing beam spot and Arrowhead 651 represents the moving direction of a recording medium. FIG. 6B shows a recording signal of the recording layer.

FIG. 6C is a graph showing the temperature distribution formed on a recording medium. This temperature distribution induced by a reproducing light spot itself on the medium. Here, at the position $X_{s1}$, the medium temperature becomes a temperature $T_s$ near the Curie temperature of the second magnetic layer. In this case, a force displacing a domain wall in a decreasing direction of domain wall energy acts if there is a gradient in the density of domain wall energy. In the first magnetic layer 601, since the domain wall coercivity is small and the domain wall mobility is large, a domain wall is easily displaced singly by this force.

In a region prior to the position $X_{s1}$, since the medium temperature is lower than $T_s$ and this region is in exchange coupling with the third magnetic layer 603 large in domain wall coercivity, a domain wall in the first magnetic layer 601 is also fixed at the position corresponding to that of the domain wall in the third magnetic layer 603. At this time, if the domain wall 606 is situated at the position $X_{s1}$ of the medium as shown in FIG. 6A, the medium temperature rises up to a temperature $T_s$ near the Curie temperature of the second magnetic layer 602 and the exchange coupling between the first magnetic layer 601 and the third magnetic layer 603 is cut. The hatched portion of FIG. 6A corresponds to this.

As a result, the domain wall 606 in the first magnetic layer 601 is "instantaneously" displaced to a region higher in temperature and smaller in domain wall energy density, i.e. a peak position of medium temperature as indicated by Arrowhead 607. Thereby, the size of the magnetic domain in the first magnetic layer 601 at the portion irradiated with a reproducing light spot is enlarged relative to that of the magnetic domain in the third magnetic layer 603. In this manner, even an infinitesimal record bit, incapable of being reproduced by an ordinary reproduction scheme, becomes a domain length capable of being reproduced on a magnetic layer under influence of the optical diffraction limit, so that a reproduction signal having much the same reproduction amplitude as with the reproduction of a record bit capable of being reproduced by an ordinary reproduction scheme and a steeper leading/training characteristic is obtained and the signal recorded at a bit length inferior to that of the diffraction limit of light. Incidentally, hereinafter, the medium displacing a magnetic domain wall in the recording magnetic domain to reproduce an information item is referred to as a domain-wall displacement type magneto optical medium.

Since such a displacement of a domain wall occurs depending upon the positional relation between the isothermal line of a temperature Ts near the Curie temperature of the second magnetic layer and the recording magnetic domain, however, the displacement timing of the magnetic domain depends upon the temperature on the surface of a substrate. Besides, the temperature of a magnetic layer on a disk substrate depends upon the power of laser beams irradiated on the disk and an actual temperature distribution on the substrate differs for individual drives, individual disks or environmental conditions such as temperature depending upon the aberration of lenses in the optical head, the slant of a light beam, a servo accuracy or the like, even if the setting of a laser power is accurate.

Furthermore, since reproduction conditions principally depend upon the temperature distribution on a disk, as mentioned above, jitter characteristics more greatly depend upon the reproduction compared to a record reproduction apparatus of ordinary magneto-optic schemes. FIG. 7 shows a relation between the reproduction power and the jitter quantity. The jitter of a reproduction signal is found to largely vary with different reproduction Power. To implement a high recording density under tolerances of the aberration of an optical system, the accuracy of individual parts, the control error of power and the like in the case of performing magnetic-wall displacement like this, there is a necessity for accurately setting the laser power at the time of reproduction.

SUMMARY OF THE INVENTION

In view of the above former problems, it is an object of the present invention to provide a reproduction power test method and an optical information reproduction apparatus capable of accurately setting the optimal reproduction power independently of the aberration of an optical system, the accuracy of individual parts and further the control error of power or the like.

And, the above object is achieved by a reproduction power test method comprising the steps of detecting the domain wall displacement start reproduction power $Pr_{dwd}$ at which domain wall starts displacement and the maximum reproduction power $Pr_{max}$ allowing the domain wall displacement; and setting an optimal reproduction power Pr on the basis of the obtained domain wall displacement start reproduction power $Pr_{dwd}$ and the maximum reproduction power $Pr_{max}$.

Besides, the object is achieved also by an optical information reproduction apparatus executing the above reproduction power test method prior to the reproduction of an information.

Further details will be elucidated in embodiments mentioned later.

DETEILED DESCRIPTION OF THE PREFERRED EMBODIMENTS

Figure 1:
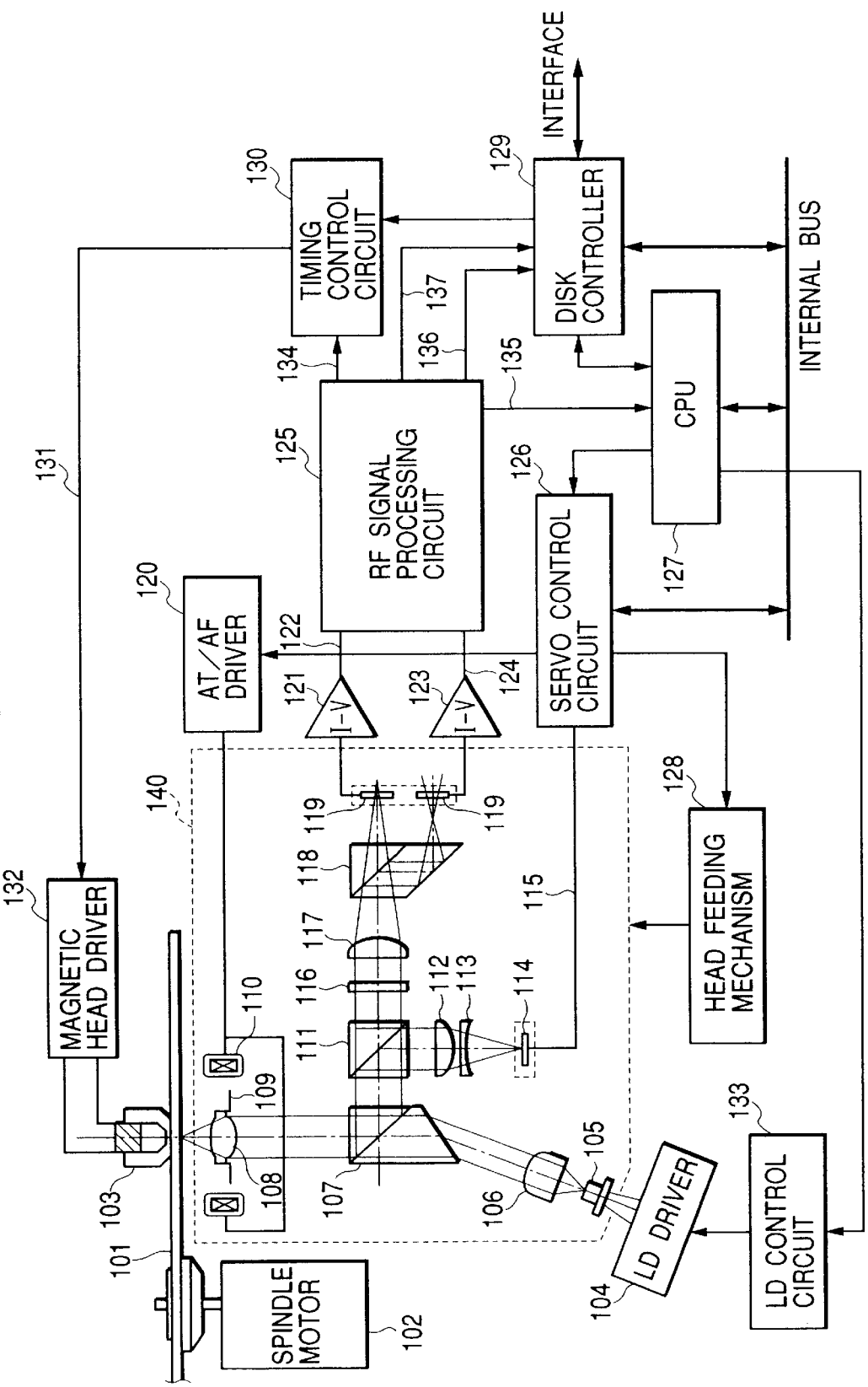
FIG. 1 is a block diagram showing the constitution of one embodiment of the present invention.

Referring to the drawings, embodiments of the present invention will be described below in detail. FIG. 1 is a block diagram showing the constitution of one embodiment of the present invention. In FIG. 1, numeral 101 denotes a magneto-optical disk serving as the domain-wall displacement type magneto-optical medium (hereinafter, simply referred to as a disk). The recording area of the disk 101 is divided in the radial direction into plural zones. Disk 101 is driven by a spindle motor 102 so as to keep the line velocity constant in each zone. The spindle motor 102 is controlled in rotational rate for every zone of the disk 101 by CPU 127 and a servo control circuit 126. The structure of the disk 101 will be described later in detail.

On the upper surface of the disk 101, a magnetic head 103 is disposed close to the disk surface. When driven by a magnetic head driver 132, the magnetic head 103 generates a magnetic field modulated according to a recording signal so as to apply it to the disk 101 at the time of information recording. In accordance with a signal from a timing control logic circuit 130, the magnetic head driver 132 supplies a driving current to the magnetic head 103. On the lower surface of the disk 101, an optical head 140 is disposed opposite the magnetic head 103. A semiconductor laser 105 is provided in the optical head 140.

A semiconductor laser 105 used for recording, reproducing and servo control, has a wavelength of 680 nm. Under the control of an LD (Laser Diode) control circuit 133, the semiconductor laser 105 is drived by LD driver 104. The laser light emitted from the semiconductor laser 105 is collimated into a parallel beam by a condenser lens 106 and enters an objective lens 108 after beam shaping at a beam splitter 107. The objective lens 108 is restricted in opening by an aperture 109. The incident beam is converged by the objective lens 108 and irradiated onto the disk 101 as an infinitesimal light spot.

Part of the laser light irradiated onto disk 101 in this manner is reflected from the disk surface, passes through the objective lens 108 and enters the beam splitter 107. This incident luminous flux is reflected from the beam splitter 107 and further split into a servo detection optical system at a beam splitter 111. The servo detection optical system comprises a condenser lens 112, a cylindrical lens 113 for focus-controlling and a servo-detecting sensor 114; a signal from the servo-detecting sensor 114 is sent to a servo control circuit 126. The servo control circuit 126 is equipped with a circuit for detecting a focus error signal and a tracking error signal on the basis of an output signal of the servo detecting sensor 114, and controls an AT/AF driver 120 on the basis of the obtained focus error signal and tracking error signal.

In the optical head 140, a focal actuator and a tracking actuator (unillustrated) for driving the objective lens 108 in the focus direction and the tracking direction, respectively, are provided, and an actuator coil 110 is provided for these actuators. In response to a focus error signal and a tracking error signal, the AT/AF driver 120 drives the driving coil 110 and performs the focus control and the tracking control by driving the objective lens 108 in the focus direction and in the tracking direction so that the light spot derived from the semiconductor laser 105 is focused together to the rotating disk 101 and moreover follows tracks of the rotating disk 101. Furthermore, in accordance with the control of the CPU 127, the servo control circuit 126 controls the track jump of a light spot and a head feeding mechanism 128 to perform the seek control of the optical head 140.

On the other hand, the signal detection optical system comprises a half wavelength plate 116, a condenser lens 117, a polarizing beam splitter 118 and a signal-detecting sensor 119 and the reflected light from the beam splitter 111 is led to the polarizing beam splitter 118 through the condenser lens 117 after rotated 45 degrees in polarizing direction at the half wavelength plate 116. The polarizing beam splitter 118 divides the incident beam into two components perpendicular to each other in polarizing direction and these divided components are detected by two sensors 119 and 119. After respectively converted into voltage signals at current/voltage conversion circuits 121 and 123, output signals of the sensors 119 and 119 are supplied to an RF signal processing circuit 125 for processing a reproduction signal.

The RF signal processing circuit 125 comprises an AGC (Automatic Gain Control) circuit, a waveform shaping circuit, a PLL (Phase Locked Loop) circuit, a time base circuit, a sample hold circuit, an A/D conversion circuit, etc., and chiefly performs analog processing of a reproduction signal. The obtained reproduction signal is digitized (signals 136 and 137) and sent to a disk controller 129. The constitution of the RF signal processing circuit 125 will be described later in detail.

A disk controller 129 has an interface circuit with external devices and co-operates with the CPU 127 under the control from the external host computer (unillustrated) to control the disk 101. Namely, the disk controller 129, comprising an external interface circuit, an ECC (Error Correcting Circuit), a memory and a memory controller, a modulator circuit, a demodulator circuit, etc., performs the recognition of an address on the disk on the basis of a reproduction signal from the disk 101, the coding, decoding and error correction, accompanying the recording/reproduction of data to/from the disk, the interface control with an external host computer and so on. Based on a signal from the disk controller 129 as mentioned above, a timing control circuit 130 supplies a recording signal 131 to be recorded in the disk 101 to the magnetic head driver 132 and further the RF signal processing circuit 125 supplies various needed timing signals 134 thereto.

Out of the main control circuit in the apparatus 127, the CPU 127 controls various parts, such as the disk controller 129, the RF signal processing circuit 125, the servo control circuit 126 and the LD control circuit 133 and performs the recording or reproduction of an information item to or from the disk 101 on the basis of an instruction from the host computer, as shown in FIG. 1. At the time of reproduction power test, the CPU 127 performs the sequence control of individual parts, performs the recording or reproduction of a testing pattern to or from the test area of the disk 101, performs a given treatment by taking in the reproduction signal amplitude from the RF signal processing circuit 125 and uses the reproduction signal amplitude to set up the optimal reproduction power. A reproduction power test method will be described later in details.

Figure 2:
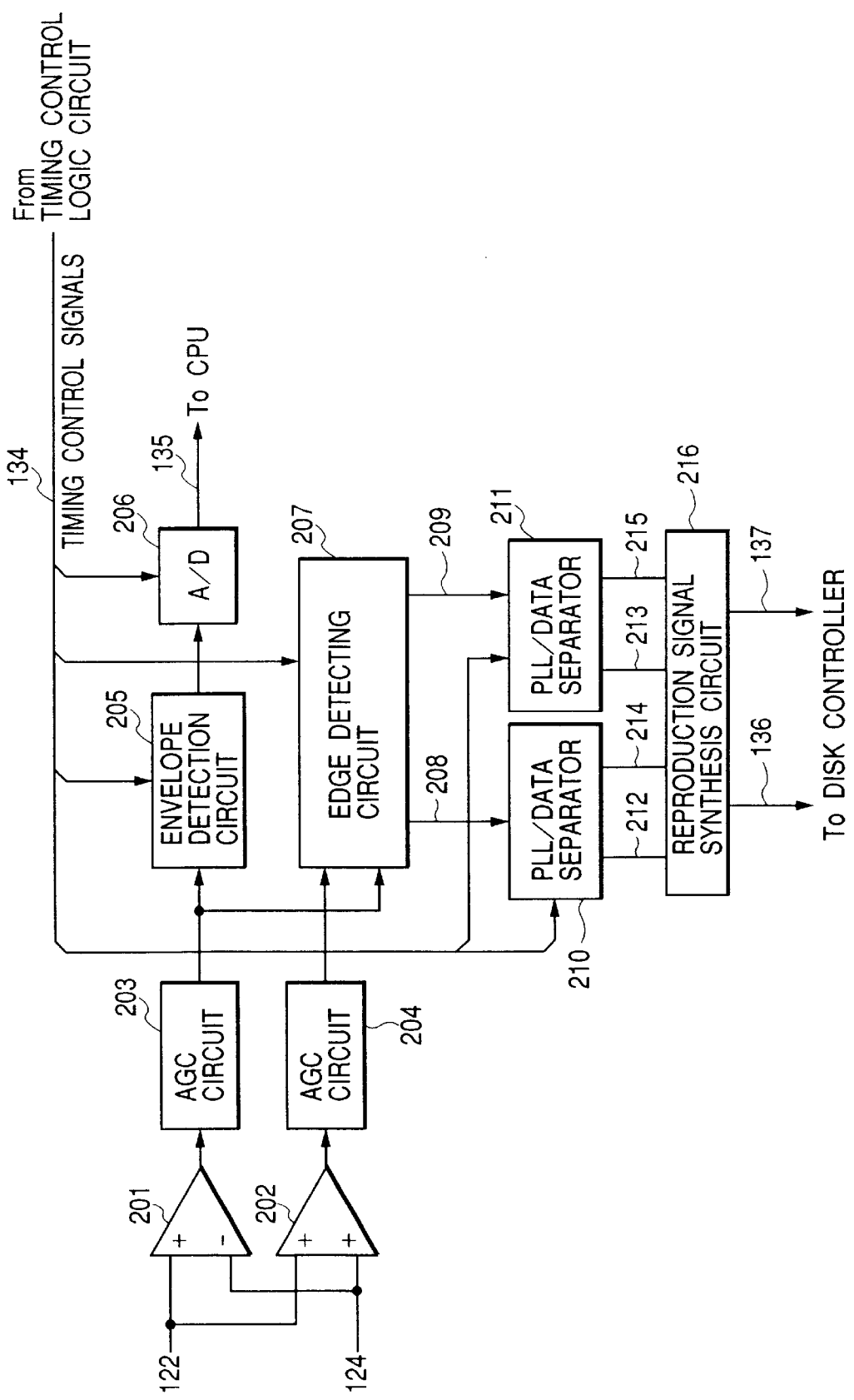
FIG. 2 is a block diagram showing the RF signal processing circuit of FIG. 1.

FIG. 2 is a block diagram showing the RF signal processing circuit 125 in detail. Output signals 122 and 124 of the current/voltage convertor circuits 121 and 123 of FIG. 1 are divided into a magneto-optical component and a sum signal component at a differential circuit 201 and an addition circuit 202. The magneto-optical signal component is output to the AGC circuit (Automatic Gain Control circuit) 203, whereas the sum signal component is output to an AGC circuit 204, both of which are adjusted to signals of respective given amplitudes. Here, at the time of reproduction power test, the envelope of a magneto-optical signal from the AGC circuit 203 is detected by an envelope detection circuit 205, so as to detect the amplitude of the magneto-optical signal. The amplitude of the magneto-optical signal is taken into the CPU 127 by an A/D converter 206 and used for the setting of the optimum reproduction power. Detecting the amplitude of the magneto-optical signal is controlled by a timing control signal from the timing control logic circuit 130.

Respective signals of the AGC circuits 203 and 204 are supplied to an edge detecting circuit 207. The edge detecting circuit 207 selects the magneto-optical signal and the sum signal in accordance with a timing control signal from the timing control logic circuit 130 to detect the respective edges of reproduction signals. With data recorded on the disk 101 according to the mark edge recording scheme, the edge detector circuit 207 detects the leading and trailing edges of the respective reproduction signals for a magneto-optical signal and a sum signal to output a leading edge signal 208 to a PLL/data separator circuit 210 and a trailing edge signal 209 to a PLL/data separator circuit 211, respectively.

The PLL/data separators 210 and 211 apply the PLL (Phase Locked Loop) to the respective edge signals to generate data clocks 212 and 213 synchronous with the input edge signals and edge signals 214 and 215 bit-synchronous with these data clocks. A reproduction signal synthesis circuit 216 restores a mark edge signal using these signals, and generates reproduction data 136 and reproduction clock 137. The reproduction data and the reproduction clock are supplied to the disk controller 129.

Figure 3:
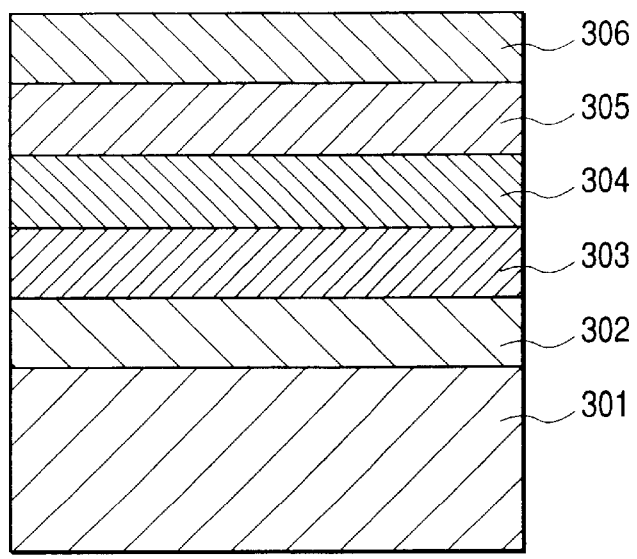
FIG. 3 is a sectional view showing the configuration of a magneto-optical disk used in the embodiment of FIG. 1.

FIG. 3 is a sectional view showing the layer construction of a disk 101 used in this embodiment. Incidentally, a three-layered structure in medium structures described in Japanese Patent Application Laid-Open No. 6-290496 exemplifies the disk 101. The figure shows a construction comprising a dielectric layer 302 as the interferential layer, a first magnetic layer (domain wall displacement layer) 303, a second magnetic layer (switching layer) 304, a third magnetic layer (memory layer) 305 and a dielectric layer 306 as the protective layer stacked in sequence on the transparent substrate 301, as a concrete example. The first magnetic layer 303 is a layer in which a domain wall is displaced, comprising a magnetic layer, smaller in domain wall coercivity and greater in domain wall mobility than the third magnetic layer 305 at a peripheral temperature. The second magnetic layer 304 is a layer for shutting off the exchange coupling force which acts from the third magnetic layer to the first magnetic layer at the displacement of the magnetic wall, comprising a magnetic layer having a Curie temperature lower than those of the first magnetic layer 303 and the third magnetic layer 305. The third magnetic layer 305 is a layer for preserving an information as a domain wall, comprising an ordinary magnetic layer excellent in the preserving stability of a domain wall.

Figure 6A:
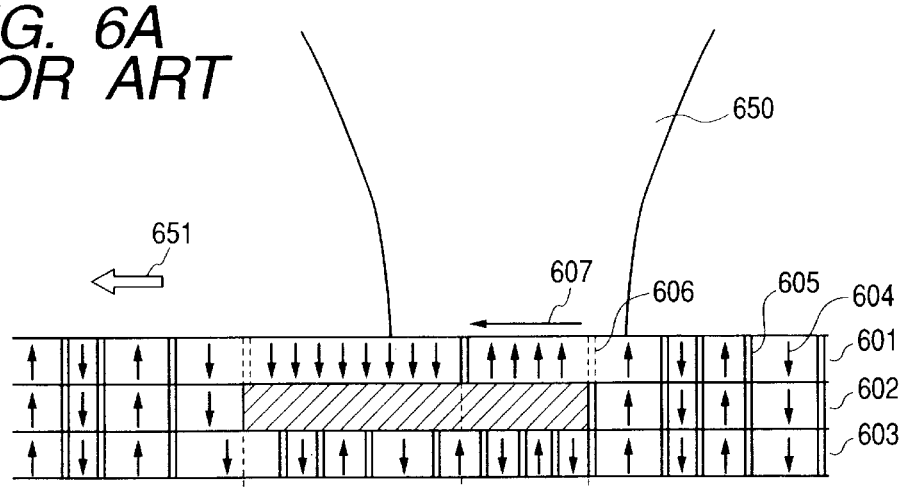
FIGS. 6A, 6B and 6C are illustrations of the principle of domain wall displacement reproduction.
Figure 6B:
Figure 6C:
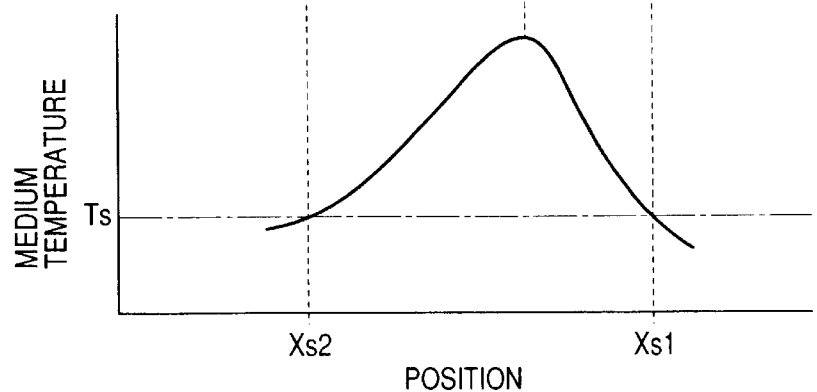
Figure 7:
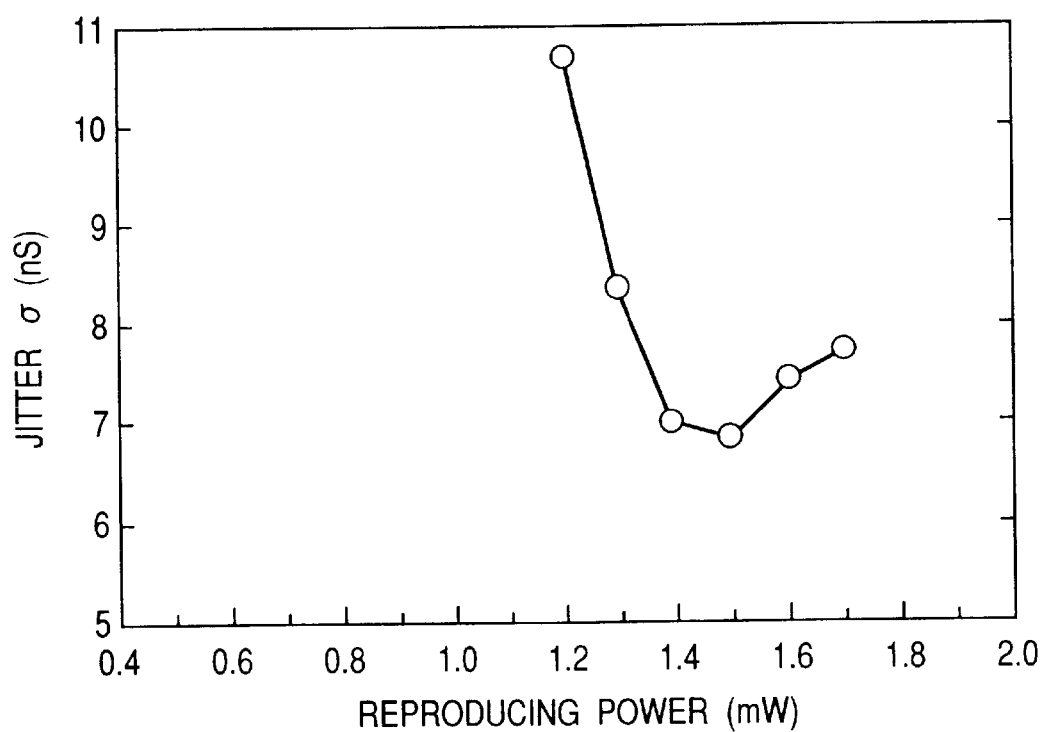
FIG. 7 is a graph showing a relation between the reproduction power and the jitter of a reproduction signal.

As the transparent substrate 301, for example, polycarbonate is used, on which a SiN layer 80 nm thick is formed as the dielectric layer 302. A GdFeCo layer 30 nm thick as the first magnetic layer 303, a DyFe layer 10 nm thick as the second magnetic layer 304 and a TbFeCo layer 40 nm thick as the third magnetic layer 305 are formed in sequence by sputtering. Finally, a SiN layer 80 nm thick is formed as the dielectric 306. Incidentally, by making thermally the magnetic characteristics disappear or eliminating the stepped structure of tracking guide grooves (unillustrated), the first to third magnetic layers 303 to 305 are magnetically divided mutually between individual information tracks. The first to third magnetic layers 303 to 305 correspond to the first to third magnetic layers 601 to 603 in FIG. 6A, respectively.

Figure 4:
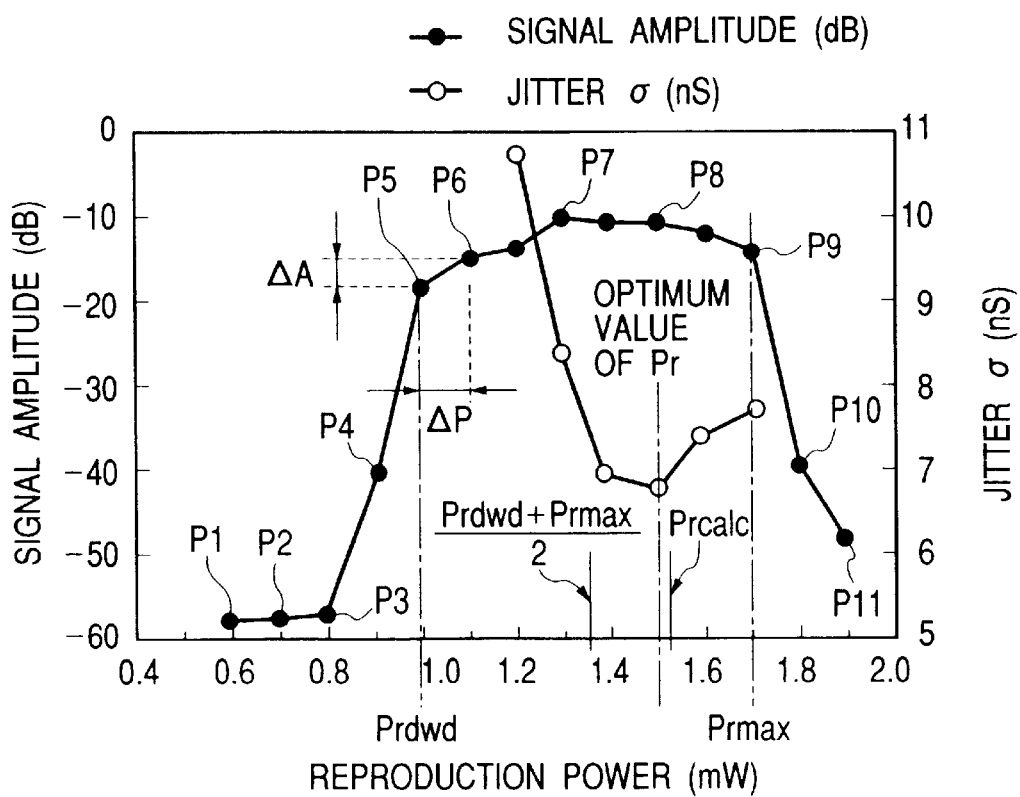
FIG. 4 is a graph showing relations of the reproduction power with the jitter of a reproduction signal and with the reproduction signal amplitude which are based on the grounds of a reproduction power test according to the present invention.

The principle of setting the optimum reproduction power by a reproduction power test method according to this embodiment will be described in the following. FIG. 4 shows the measured results of the amplitude of a reproduction signal (magneto-optical signal) and jitter for reproduction power. FIG. 4 represents a case of the reproduction of 0.15 $\mu$m repetition mark length patterns at line velocity of 1.5 m/sec at a radial position of 24.6 mm on the disk using a reproduction laser beam of 680 nm laser wavelength. First, in a reproduction power range from P1 to P3, since the medium does not arrive at a temperature higher than the Curie temperature of the second magnetic layer, the first magnetic layer 303 remains in exchange coupling with the third magnetic layer 305 which has a large domain wall coercivity, and no enlargement of a magnetic domain occurs due to displacement of the domain wall, so that no reproduction signal comprising successive repetition signals of 0.15 $\mu$m bit length is obtained in reproduction using a reproducing light beam of 680 nm wavelength.

At the P4 level (between P3 and P5) of reproduction power, since a portion where the medium acquires the Curie temperature of the second magnetic layer comes into existence, the enlargement of a domain wall due to the domain wall displacement begins to occur, but an area greater in medium temperature than the Curie temperature of the second magnetic layer is not yet sufficiently large relative to the beam size, so that the area which acquires the Curie temperature of the second magnetic layer enlarges with the rising reproduction power, and the reproduction signal amplitude increases. When the reproduction power further increases, the degree of enlargement of the area which acquires the Curie temperature of the second magnetic layer accompanying an increase in reproduction power decreases with an approach thereof to the zone irradiated with a reproduction beam, so that the reproduction signal amplitude gently changes with a change in reproduction power for a range from P5 to P9. The P5 level corresponds to the displacement initiation reproduction power at which the domain wall begins to be displaced, whereas the P9 level corresponds to the maximum reproduction power at which the domain wall is displaced.

At and above the P7 level, since the Kerr rotation angle falls as a result of a rise in the medium temperature, the reproduction signal amplitude gradually decreases with increasing reproduction power. At and above the P9 level of reproduction power, since the medium temperature reaches and exceeds Curie temperature of the third magnetic layer and the magnetic domain recorded in the third magnetic layer begins to disappear, the signal amplitude lowers rapidly. Thereby, the reproduction power must be set at a range between the P5 level and the P9 level. The value of jitter indicates a minimum at the P8 level of reproduction power, a rapid rise with the decrease of reproduction power below the P8 level and a gradual rise with the increase of the reproduction power above the P8 level. The above-discussed data are measured values for a given medium, and absolute optimum values of reproduction power vary with a prescription or the like of a medium, but the general tendency is to become similar to one another.

For this reason, letting the domain wall displacement start reproduction power $Pr_{dwd}$ be the power P5 at which the domain wall of FIG. 4 begins to be displaced and $Pr_{max}$ be the maximum reproduction power P9 in domain wall displacement, the optimum value of reproduction power can be evaluated by detecting the domain wall displacement start reproduction power $Pr_{dwd}$ and the maximum reproduction power $Pr_{max}$. Namely, the optimum reproduction power Pr should be the mean between $(Pr_{dwd}+Pr_{max})/2$ and $Pr_{max}$ and can be found in accordance with equation (1):

$$Pr=(Pr_{dwd}+3Pr_{max})/4 \qquad (1).$$

Figure 5:
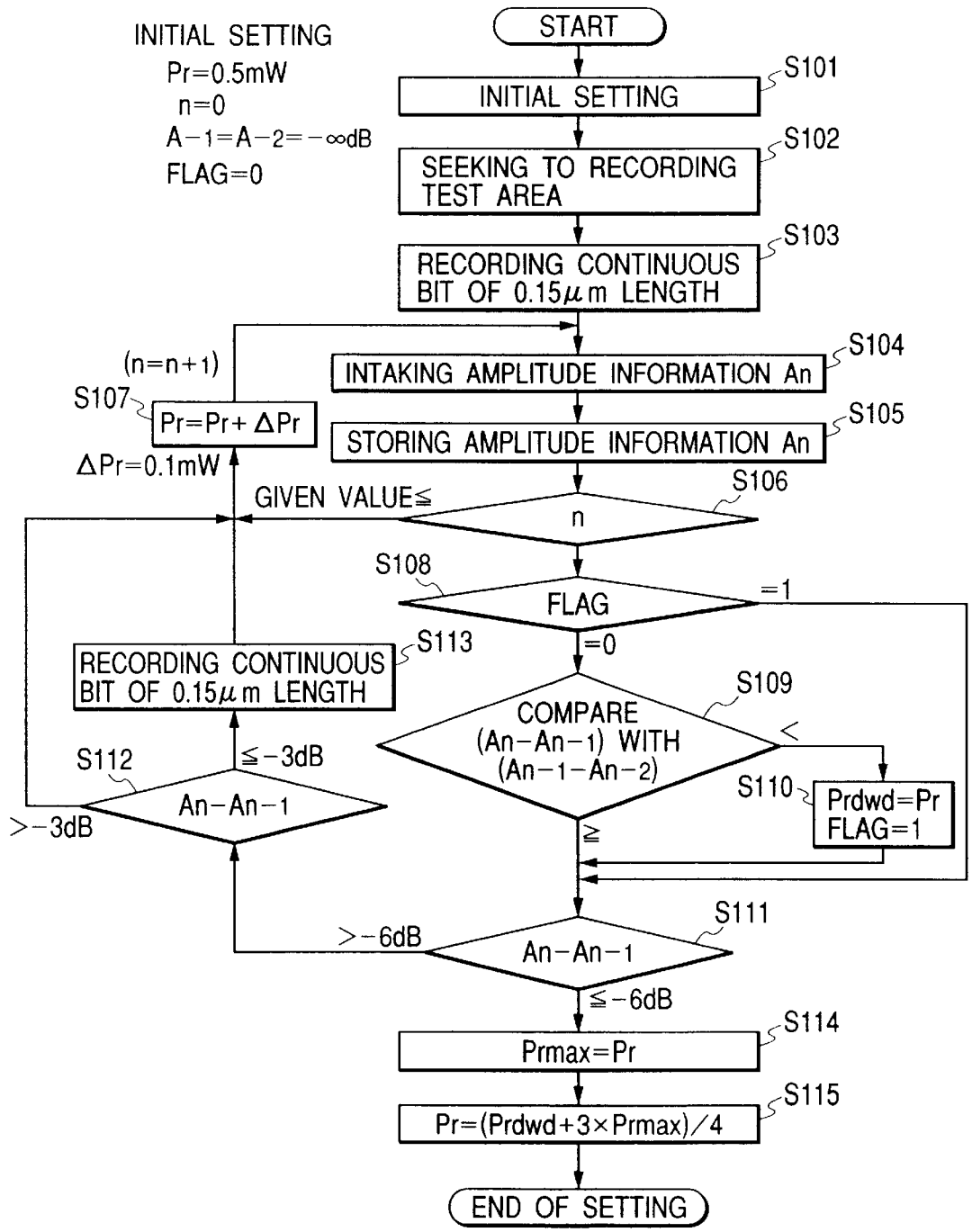
FIG. 5 is a flowchart showing one embodiment of reproduction power test method according to the present invention.

In this embodiment, an attempt is made to set the optimum reproduction power in a reproduction case of a domain wall displacement type magneto-optical medium on he basis of such an idea. Thus, referring to the flowchart of FIG. 5, a reproduction power test method according to this embodiment will be explained in detail. In the following explanation, the disk 101 is divided in the radial direction into plural zones and a reproduction power test shall be made for every zone. In each zone of the disk 101, a testing zone for a reproduction power test is provided. In FIG. 5, first, the setting of initial values of reproduction power, the setting of the number of reproductions n in the case of detecting the reproduction signal amplitude, the setting of information items A1 and A2 and the setting of a flag are carried out (S101). Initial values of 0.5 mW as the reproduction power, n=0 and $A_{-1}=A_{-2}=-\infty$ dB have been assumed. The flag serves to indicate whether or not the domain wall displacement start power was detected and its initial value is 0.

Next, by controlling the head feeding mechanism 128 via the servo control circuit 126, the optical head 140 is made to seek a test area of the target zone (S102). The magnetic head 103 moves to the test area in linkage with the optical head 140. After the completion of seek, the testing patterns for repetition patterns of mark lengths incapable of reproduction by a normal reproduction are recorded in plural predetermined sectors (S103). In this embodiment, repetition patterns (duty 50%) of 0.15 µm mark length, for example, shall be recorded.

In the case of recording this testing pattern, the LD control circuit 133 is controlled to make the optical output of the semiconductor laser 105 into recording light power and a recording is carried out by sending a signal for recording a repetition pattern of 0.15 µm mark length to the magnetic head driver 132 while irradiating the test area with a recording light beam and by applying a recording magnetic field to the irradiation position of the recording light beam from the magnetic head 103. After completion of recording, the optical output of the semiconductor laser 105 is set to the initial value of reproduction power and the reproduction of the testing pattern recorded in the test area is accomplished to take in the reproduction signal amplitude An (S104). In this case, the signal amplitude of a reproduction signal (magneto-optical signal) is detected by the envelope detection circuit 205 as described in FIG. 2, which is digitized by the A/D converter 206 and taken into CPU 127. The amplitude information is stored in the internal memory of the CPU 127 (S105).

Next, it is discriminated whether or not the following relation holds: the number of reproductions n=<a predetermined value (S106), and then the step advances to S107 because n=0 in this case to set the reproduction power Pr to Pr+ΔPr and the number of reproductions n to n+1. In this embodiment, ΔPr is set to 0.1 mW to perform the processing beginning with step S104 again. Namely, the reproduction power is augmented by ΔPr and a testing pattern is reproduced again to perform the intake of a reproduction signal amplitude and store thereof into a memory. In this manner, the processing of S104 to S107 is repeated to perform a similar processing till n> the predetermined value is effected. Reproduction proceeds while augmenting the reproduction power by 0.1 mW as a given value of this case from the initial value (0.5 mW) and the number of repetition shall be set till the reproduction power reaches or exceeds the domain wall displacement start power as shown in FIG. 4.

After n reaches or exceeds the predetermined value, the step advances to S108 to discriminate a flag. This flag is a flag for discriminating whether or not the domain wall displacement start power $Pr_{dwd}$ described in FIG. 4 has already been detected, and its initial value is 0 as mentioned above. At this time, since the flag is 0, the step advances to S109 to detect the domain wall displacement start power $Pr_{dwd}$ at which the magnetic wall begins to be displaced. Namely, the reproduction power is gradually augmented from the reproduction power at which no domain wall displacement occurs to detect a power at which the changing rate of a reproduction signal amplitude decreases with an infinitesimal change in reproduction power (0.1 mW in this embodiment). In other words, the area whose temperature reaches the Curie temperature of the second magnetic layer approaches the zone irradiated by a reproducing light beam, the degree of enlargement accompanying an increase in reproduction power for the area whose temperature reaches the Curie temperature of the second magnetic layer decreases, and a power by which the reproduction signal amplitude begins to gently vary with a change in reproduction power is detected as the domain wall displacement start power $Pr_{dwd}$.

As a specific detection method, first, reproduction signal amplitudes are detected multiple times for varied reproduction power at S104 to S107, while the signal amplitude of this time is designated with $A_n$, that of the last time is with $A_{n-1}$ and that of the last but one time is with $A_{n-2}$. And, the difference $(A_n-A_{n-1})$ between the signal amplitude $A_n$ of this time and that $A_{n-1}$ and the difference between that $A_{n-1}$ of the last time and that $A_{n-2}$ of the last but one time are compared in sequence from the smaller reproduction power. In this manner, the quantity $\Delta A$ of a change in signal amplitude between this time and the last time is compared in sequence to detect the reproduction power P5 at which the quantity $\Delta A$ of a change in signal amplitude of this time $(A_n-A_{n-1})$ is smaller than that $\Delta A$ of a change in signal amplitude of the last time $(A_{n-1}-A_{n-2})$ as shown in FIG. 4. Next, at S110, the domain wall displacement start power $Pr_{dwd}$ at which the domain wall begins to be displaced is set to this power Pr ($Pr=Pr_{dwd}$) and the flag is set to 1.

After the domain wall displacement start power is detected, the step advances to S111 to detect the maximum reproduction power during the domain wall displacement. Namely, the difference $A_n-A_{n-1}$ at S111, that is, the reproduction power at which the signal amplitude $A_{n-1}$ falls by not less than 6 dB relative to that of the last time is detected. This means successive discrimination whether or not the difference in signal amplitude from the last time and this time is not less than 6 dB for the reproduction power of P5 and later in FIG. 4. In this embodiment, the reproduction power at which the quantity of a change in signal amplitude between the last time and this time drastically increases is detected as the maximum reproduction power during the domain wall displacement, and this quantity of change is found to be −6 dB. The value is not limited to this. In FIG. 4, since the reproduction power drastically falls in the progress from P9 to P10, the reproduction power P9 is found to be the maximum reproduction power. Here, even if the signal amplitude of this time falls relative to that of the last time, a case in which the relevant quantity is less than 6 dB is that in which the quantity of a change in signal amplitude is small and the power does not reach the maximum reproduction power.

In this case, the step advances to S112 to discriminate again whether or not the signal amplitude $A_{n-1}$ falls by 3 dB relative to that $_{An}$ of last time. If the quantity of a change in signal amplitude between the last time and this time is less than 3 dB, the reproduction power is not sufficiently achieved in detecting the maximum reproduction power. Accordingly, a repetition pattern of 0.15 μm mark length is recorded on the same track as with the testing pattern of S103 at S113. Next, the step advances to S107 to further augment the reproduction power Pr by ΔPr. If the quantity of a change in signal amplitude between the last time and this time is greater than 3 dB at S112, the step advances to S107 as it is to augment the reproduction power by Δpr.

Thereafter, the processing of S104, S105, S106, S108, S111, S112, (S113) and S107 is repeated, the reproduction power is further increased by ΔPr each time and a reproduction signal amplitude is detected to successively discriminate whether or not the signal amplitude falls by not less than 6 dB between the last time and this time. Here, at S111, if the signal amplitude $A_{n-1}$ of this time falls by not less than 6 dB relative to that $A_n$ of the last time, this is a case in which the reproduction power has drastically changed from P9 to P10 as shown in FIG. 4. In this case, the reproduction power P9 of the last time in this case is detected as the maximum reproduction power $Pr_{max}$ during the domain wall displacement (S114). Subsequently, at S115, the optimum reproduction power Pr is computed in accordance with Formula (1) on the basis of the domain wall displacement start reproduction power $Pr_{dwd}$ and the maximum reproduction power obtained in such a manner as described in FIG. 4, and stored in memory.

Like these, a process of setting the optimum reproduction power of a reproducing light beam is completed and subsequently a similar process of setting the optimum reproduction power is carried out for every zone of the disk 101 and the respective results are stored in memory. Thereafter, at the time of reproduction of recorded information on the disk 101, the corresponding reproduction power is read out from memory for every zone and the LD control circuit 133 is controlled correspondingly to perform the reproduction of the information item by setting the reproduction power to the optimum reproduction power. Incidentally, when a disk 101 is mounted on an apparatus, a reproduction power test of FIG. 5 is made for every fixed period of time, if the temperature change in the apparatus exceeds a constant value or in like cases.

What is claimed is:

1. A reproduction power test method for setting an optimal power of a reproduction light beam for reproducing information from a domain wall displacement type magneto-optical medium, comprising the steps of:

detecting a domain wall displacement start reproduction power $Pr_{dwd}$ at which the domain wall starts to be displaced, and a maximum reproduction power $Pr_{max}$ allowing the domain wall displacement; and determining an optimal reproduction power Pr using a previously obtained relational expression whereby the obtained domain wall displacement start reproduction power $Pr_{dwd}$, the maximum reproduction power $Pr_{max}$, and a jitter characteristic of a reproduced signal are optimized.

2. The reproduction power test method according to claim 1, wherein the optimal reproduction power Pr is set at a value between the domain wall displacement start reproduction power $Pr_{dwd}$ and the maximum reproduction power $Pr_{max}$.

3. The reproduction power test method according to claim 2, wherein the optimal reproduction power Pr is defined in terms of the following relational expression:

$$Pr=(Pr_{dwd}+3\times Pr_{max})/4.$$

4. The reproduction power test method according to claim 1, wherein the medium has a disk shape and is divided into plural zones, and the reproduction power test is carried out for each zone.

5. The reproduction power test method according to claim 1, further comprising the steps of:

changing stepwise the reproduction power;

detecting an amplitude value of a reproduction signal for each reproduction power; and detecting a quantity of change in the amplitude value, wherein the reproduction power at which the quantity of change first decreases is defined as the domain wall displacement start reproduction power $Pr_{dwd}$.

6. The reproduction power test method according to claim 1, further comprising the steps of:

changing stepwise the reproduction power;

detecting an amplitude value of a reproduction signal for each reproduction power; and detecting a quantity of change in the amplitude value, wherein the reproduction power at which the quantity of change decreases by a predetermined amount is defined as the maximum reproduction power $Pr_{max}$ allowing the domain wall displacement.

7. An optical information reproduction apparatus for performing a reproduction power test method for setting an optimal power of a reproduction light beam for reproducing information from a domain wall displacement type magneto-optical medium, prior to reproduction of the information, said apparatus comprising:

means for detecting a domain wall displacement start reproduction power $Pr_{dwd}$ at which the domain wall starts to be displaced, and a maximum reproduction power $Pr_{max}$ allowing the domain wall displacement; and means for determining an optimal reproduction power Pr using a previously obtained relational expression whereby the obtained domain wall displacement start reproduction power $Pr_{dwd}$, the maximum reproduction power $Pr_{max}$, and a jitter characteristic of a reproduced signal are optimized.

8. The optical information reproduction apparatus according to claim 7, wherein the optimal reproduction power Pr is set at a value between the domain wall displacement start reproduction power $Pr_{dwd}$ and the maximum reproduction power $Pr_{max}$.

9. The optical information reproduction apparatus according to claim 8, wherein the optimal reproduction power Pr is defined in terms of the following relational expression:

$$Pr=(Pr_{dwd}+3\times Pr_{max})/4.$$

10. The optical information reproduction apparatus according to claim 7, wherein the medium has a disk shape and is divided into plural zones, and the reproduction power test is carried out for each zone.

11. The optical information reproduction apparatus according to claim 7, further comprising:

means for changing stepwise the reproduction power;

means of detecting an amplitude value of a reproduction signal for each reproduction power; and means of detecting a quantity of change in the amplitude value, wherein the reproduction power at which the quantity of change first decreases is defined as the domain wall displacement start reproduction power $Pr_{dwd}$.

12. The optical information reproduction apparatus according to claim 7, further comprising:

means for changing stepwise the reproduction power;

means of detecting an amplitude value of a reproduction signal for each reproduction power; and means of detecting a quantity of change in the amplitude value, wherein the reproduction power at which the quantity of change decreases by a predetermined amount is defined as the maximum reproduction power $Pr_{max}$ allowing the domain wall displacement.

* * * * *

UNITED STATES PATENT AND TRADEMARK OFFICE
CERTIFICATE OF CORRECTION

PATENT NO. : 6,519,212 B2
DATED : February 11, 2003
INVENTOR(S) : Takaaki Ashinuma It is certified that error appears in the above-identified patent and that said Letters Patent is hereby corrected as shown below:

<u>Title page,</u>
Item [56], References Cited, U.S. PATENT DOCUMENTS,
"5,517,471 A   5/1996   Ashimuna et al." should read
-- 5,517,471 A   Ashinuma et al. --; and "6,084,830 A   7/2000   Ashimuna et al." should read -- 6,084,830 A   7/2000   Ashinuma et al. --.

<u>Column 2,</u>
Line 34, "magneto optical" should read -- magneto-optical --.
Line 57, "Power." should read -- power. --.

<u>Column 3,</u>
Line 17, "an information" should read -- information --.
Line 44, "DETEILED" should read -- DETAILED --.

<u>Column 4,</u>
Line 7, "drived" should read -- driven --.

<u>Column 6,</u>
Line 37, "making thermally" should read -- thermally making --.

<u>Column 7,</u>
Line 51, "he" should read -- the --.

<u>Column 8,</u>
Lines 41 and 45, "till" should read -- until --.
Line 44, "repetition" should read -- repetitions --.

UNITED STATES PATENT AND TRADEMARK OFFICE
CERTIFICATE OF CORRECTION

PATENT NO. : 6,519,212 B2
DATED : February 11, 2003
INVENTOR(S) : Takaaki Ashinuma It is certified that error appears in the above-identified patent and that said Letters Patent is hereby corrected as shown below:

Column 9,
Line 47, "that$_{An}$" should read -- that $A_n$ --.
Line 59, "(S113)" should read -- S113 --.

Signed and Sealed this

Twenty-first Day of October, 2003

JAMES E. ROGAN
*Director of the United States Patent and Trademark Office*